US012672019B2

(12) United States Patent
Zheng et al.

(10) Patent No.: US 12,672,019 B2
(45) Date of Patent: Jun. 30, 2026

(54) COMMUNICATION METHOD AND APPARATUS

(71) Applicant: HUAWEI TECHNOLOGIES CO., LTD., Shenzhen (CN)

(72) Inventors: Juan Zheng, Beijing (CN); Chaojun Li, Beijing (CN); Hailong Hou, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 322 days.

(21) Appl. No.: 18/344,285

(22) Filed: Jun. 29, 2023

(65) Prior Publication Data

US 2023/0345285 A1 Oct. 26, 2023

Related U.S. Application Data

(63) Continuation of application No. PCT/CN2021/072237, filed on Jan. 15, 2021.

(51) Int. Cl.
*H04W 24/10* (2009.01)
*H04W 36/00* (2009.01)
*H04W 72/0457* (2023.01)

(52) U.S. Cl.
CPC ....... *H04W 24/10* (2013.01); *H04W 36/0085* (2018.08); *H04W 72/0457* (2023.01)

(58) Field of Classification Search
None
See application file for complete search history.

(56) References Cited

U.S. PATENT DOCUMENTS

| | | | | |
|---|---|---|---|---|
| 2008/0205351 | A1* | 8/2008 | Lindoff | ............ H04L 27/26025 |
| | | | | 370/336 |
| 2010/0273487 | A1* | 10/2010 | Alonso-Rubio | .... H04W 36/385 |
| | | | | 455/436 |
| 2019/0182000 | A1* | 6/2019 | Futaki | ................... H04L 5/0092 |
| 2020/0344019 | A1 | 10/2020 | Da Silva et al. | |
| 2021/0014751 | A1* | 1/2021 | Callender | ......... H04W 72/0446 |

(Continued)

FOREIGN PATENT DOCUMENTS

| | | | |
|---|---|---|---|
| CN | 109906651 A | 6/2019 | |
| CN | 110574328 A | 12/2019 | |
| WO | 2014166099 A1 | 10/2014 | |
| WO | WO-2018028423 A1 * | 2/2018 | ............ H04W 24/10 |

(Continued)

OTHER PUBLICATIONS

Author Unknown, Email discussion summary for [97e][201] NR_NewRAT_RRM_Core, Doc No. R4-2017271, pp. 1-73, Nov. 13, 2020.*

(Continued)

*Primary Examiner* — Christopher M Crutchfield
(74) *Attorney, Agent, or Firm* — Fish & Richardson P.C.

(57) ABSTRACT

Communication methods and apparatuses are provided. In an implementation, a method includes: determining first information and second information, wherein the first information comprises a first measurement duration and a first measurement period, and the second information comprises a second measurement duration and a second measurement period, applying the first measurement period and the first measurement duration to perform radio resource management (RRM) measurement on a first-type cell, and applying the second measurement period and the second measurement duration to perform the RRM measurement on a second-type cell.

18 Claims, 7 Drawing Sheets

(56)             References Cited

U.S. PATENT DOCUMENTS

| | | | | |
|---|---|---|---|---|
| 2021/0045076 A1* | 2/2021 | Tomeba | .............. | H04W 56/001 |
| 2021/0051618 A1* | 2/2021 | Yang | ..................... | H04W 48/08 |
| 2021/0175985 A1* | 6/2021 | Yoon | ..................... | H04W 56/00 |
| 2021/0219251 A1* | 7/2021 | Tang | ................... | H04W 56/001 |
| 2022/0217562 A1* | 7/2022 | Tang | ..................... | H04W 24/10 |
| 2022/0247534 A1* | 8/2022 | Hu | ....................... | H04L 5/0001 |

FOREIGN PATENT DOCUMENTS

| | | | |
|---|---|---|---|
| WO | WO/2021/068226 | * | 12/2019 |
| WO | 2020083121 A1 | | 4/2020 |

OTHER PUBLICATIONS

Author Unknown, CR to 38.133: Correction to SCell activation delay requirements, pp. 1-5, Nov. 11, 2020.*

Author Unknown, CR to SSB-less Scell activation delay requirement for deactivated FR1 SCell, pp. 1-5, Nov. 13, 2020.*

Nokia et al., "On Initial Access and Mobility for NR-U," 3GPP TSG RAN WG1 Meeting #94bis, R1-1810624, Chengdu, China, Oct. 8-12, 2018, 9 pages.

3GPP TS 38.133 V17.0.0, "3rd Generation Partnership Project; Technical Specification Group Radio Access Network; NR; Requirements for support of radio resource management (Release 17)," Dec. 2020, 1812 pages.

International Search Report and Written Opinion in International Appln. No. PCT/CN2021/072237, mailed on Oct. 15, 2021, 15 pages (with English translation).

Extended European Search Report in European Appln No. 21918586.5, dated Dec. 18, 2023, 9 pages.

* cited by examiner

COMMUNICATION METHOD AND APPARATUS

CROSS-REFERENCE TO RELATED APPLICATIONS

This application is a continuation of International Application No. PCT/CN2021/072237, filed on Jan. 15, 2021, the disclosure of which is hereby incorporated by reference in its entirety.

TECHNICAL FIELD

This application relates to the field of wireless communication technologies, and in particular, to a communication method and apparatus.

BACKGROUND

A main purpose of radio resource management (radio resource management, RRM) measurement is to monitor communication quality of a serving cell and/or a neighboring cell of a terminal device in real time, and is an indispensable part in a communication process between the wireless terminal device and a network device. When the terminal device needs to perform the RRM measurement, and an active bandwidth part (bandwidth part, BWP) used by the terminal device at a current moment for data transmission does not include a to-be-measured RRM measurement reference signal (for example, a synchronization signal block (synchronization signal block, SSB), or a channel state information reference signal (channel state information reference signal, CSI-RS)), the terminal device needs to complete the RRM measurement by using a measurement gap (measurement gap, MGP).

Currently, the network device configures a measurement duration and a measurement period of the MGP for the terminal device, and the terminal device performs the RMM measurement in the serving cell and a plurality of neighboring cells based on the configured measurement duration and the configured measurement period. Because positions and periods of RRM measurement reference signals in different cells may be different, efficiency of performing measurement based on a same measurement duration and a same measurement period is low, and power waste is caused.

SUMMARY

An objective of embodiments of this application is to provide a communication method and apparatus, to improve flexibility of RRM measurement.

According to a first aspect, this application provides a communication method. The method is applicable to a scenario in which a terminal device performs RRM measurement. The method is performed by the terminal device or a module in the terminal device. Herein, an example in which the terminal device is an execution body is used for description. The method includes: determining or obtaining first information and second information, where the first information may include a first measurement duration and a first measurement period, and the second information may include a second measurement duration and a second measurement period; and performing RRM measurement by using the first information or the second information.

In the method, a plurality of measurement durations and measurement periods are configured for the terminal device, and the terminal device may perform measurement by using different measurement durations and measurement periods in different cases to improve flexibility of the RRM measurement.

In a possible implementation, the first measurement duration is less than the second measurement duration, or the first measurement period is greater than the second measurement period; or the first measurement duration is less than the second measurement duration, and the first measurement period is greater than the second measurement period.

According to the method, when the terminal device performs the RRM measurement by using the first information, each interruption on an active BWP is a first duration, which is shorter than a second duration caused by performing the RRM measurement by using the second information. This can significantly reduce an interruption duration of data transmission, and improve data transmission efficiency. In addition, if the first measurement period is greater than the second measurement period, interruption frequency of the data transmission can also be reduced, and the data transmission efficiency can also be improved.

In a possible implementation, the first measurement period and/or the first measurement duration are/is applied when radio resource management RRM measurement is performed on a first-type cell; and the second measurement period and the second measurement duration are applied when the RRM measurement is performed on a second-type cell.

According to the method, by setting different measurement durations and/or measurement periods for different types of cells, the RRM measurement may be completed by using measurement durations and measurement periods suitable for different scenarios. This reduces measurement overheads. In addition, when an active BWP does not include a to-be-measured SSB, a shorter measurement duration and/or a larger measurement period may be configured, to reduce impact of interruption on data transmission on the active BWP.

In an implementation, the first information and the second information correspond to different types of reference signals. For example, the first measurement period and/or the first measurement duration are/is applied when the RRM measurement is performed based on a first-type reference signal. The second measurement period and/or the second measurement duration are/is applied when the RRM measurement is performed based on a second-type reference signal.

In a possible implementation, the first-type reference signal is an SSB, and the second-type reference signal is a CSI-RS.

In a possible implementation, a period of the first-type reference signal is less than a period of the second-type reference signal.

In a possible implementation, before performing the RRM measurement, the method further includes: determining that an active BWP does not include an RRM measurement reference signal.

In a possible implementation, the first-type cell includes a serving cell, and the second-type cell includes a non-serving cell.

In a possible implementation, the first-type cell includes a serving cell and a non-serving cell that has a fixed timing difference from timing information of the serving cell, and the second-type cell includes a non-serving cell that does not have the fixed timing difference from the timing information of the serving cell.

According to the method, timing information of the first-type cell can be obtained in advance, and does not need to be obtained in a blind detection manner, and compared with the second-type cell, time for performing the RRM measurement by the terminal device can be reduced. Therefore, when the RRM measurement is performed on the first-type cell, the first measurement duration for performing the RRM measurement may be less than the second measurement duration for performing the RRM measurement on the second-type cell; and/or when the RRM measurement is performed on the first-type cell, the first measurement period in which the RRM measurement is performed may be greater than the second measurement period in which the RRM measurement is performed on the second-type cell.

In a possible implementation, before the RRM measurement is performed on the second-type cell, the method further includes: determining that a measurement result of performing the RRM measurement on the first-type cell meets a preset condition.

In a possible implementation, the preset condition is: The measurement result obtained in at least one first measurement period within a preset time range is less than a preset threshold.

In a possible implementation, before the RRM measurement is performed on the second-type cell, the method further includes: receiving third information, where the third information indicates to perform the RRM measurement on the second-type cell by using the second information.

In a possible implementation, the third information is carried in downlink control information DCI or a media access control MAC control element CE.

In this way, when quality of service of the serving cell deteriorates, RRM measurement on more non-serving cells by using the second information can be quickly started, thereby quickly determining a possible candidate cell.

In a possible implementation, the first measurement duration includes one or more of a first duration, a second duration, or a third duration; within the first duration, the second duration, and the third duration, no physical uplink channel and physical uplink signal is sent to a network device, and no physical downlink channel and downlink signal is received from the network device; and the first duration is a continuous transmission duration of an RRM measurement reference signal on which the RRM measurement is to be performed, the second duration is a preset duration before a start symbol of the RRM measurement reference signal, and the third duration is a preset duration after an end symbol of the RRM measurement reference signal.

In this way, impact of behavior of the terminal device on the RRM measurement can be reduced, accuracy of the RRM measurement can be improved, and resource utilization can be improved.

In a possible implementation, the second duration is 140 μs or 500 μs; and the third duration is 140 μs or 500 μs.

In a possible implementation, within the first measurement duration, no physical uplink channel and physical uplink signal is sent to a network device, and no physical downlink channel and downlink signal is received from the network device.

In this way, impact of behavior of the terminal device on the RRM measurement can be reduced, and accuracy of the RRM measurement can be improved.

In a possible implementation, the first measurement duration is the same as a measurement duration of a synchronization information block measurement timing configuration SMTC, and/or the first measurement period is the same as a measurement period of the SMTC.

Based on the implementation, a configuration of the SMTC may be reused, so that signaling overheads for configuring the first measurement duration and/or the first measurement period can be reduced.

In a possible implementation, the first measurement duration is less than or equal to 1 millisecond, and the first measurement period is greater than or equal to 40 milliseconds.

In this way, it can be ensured that the first measurement duration is less than the second measurement duration, and the first measurement period is greater than the second measurement period.

In a possible implementation, the first measurement duration and the first measurement period meet any one of the following: The first measurement duration is equal to 1.5 milliseconds, and the first measurement period is equal to 20 milliseconds; the first measurement duration is equal to 1.5 milliseconds, and the first measurement period is equal to 40 milliseconds; the first measurement duration is equal to 1.5 milliseconds, and the first measurement period is equal to 80 milliseconds; and the first measurement duration is equal to 1.5 milliseconds, and the first measurement period is equal to 160 milliseconds.

In this way, it can be ensured that a first duration of a first measurement gap is minimum, and an existing gap pattern can be reused, thereby improving system compatibility.

In a possible implementation, a frequency range corresponding to the first information is the same as a frequency range corresponding to the second information.

According to a second aspect, this application provides a communication method. The method is applicable to a scenario in which a terminal device performs RRM measurement. The method is performed by a network device or a module in the network device. Herein, an example in which the terminal device is an execution body is used for description. The method includes: determining first information and second information, where the first information includes a first measurement duration and a first measurement period, and the second information includes a second measurement duration and a second measurement period; and indicating the first information and the second information to a terminal device.

In a possible implementation, the first measurement duration is less than the second measurement duration, and/or the first measurement period is greater than the second measurement period.

In an implementation, the first measurement period and/or the first measurement duration are/is applied to performing RRM measurement on a first-type cell, and the second measurement period and the second measurement duration are applied to performing the RRM measurement on a second-type cell.

In an implementation, the first information and the second information correspond to different types of reference signals. For example, the first measurement period and/or the first measurement duration are/is applied when the RRM measurement is performed based on a first-type reference signal. The second measurement period and/or the second measurement duration are/is applied when the RRM measurement is performed based on a second-type reference signal.

In a possible implementation, the first-type reference signal is an SSB, and the second-type reference signal is a CSI-RS.

In a possible implementation, a period of the first-type reference signal is less than a period of the second-type reference signal.

In a possible implementation, the first-type cell includes a serving cell, and the second-type cell includes a non-serving cell.

In a possible implementation, the first-type cell includes a serving cell and a non-serving cell that has a fixed timing difference from timing information of the serving cell, and the second-type cell includes a non-serving cell that does not have the fixed timing difference from the timing information of the serving cell.

In a possible implementation, the method further includes: sending third information to the terminal device, where the third information indicates to perform the RRM measurement on the second-type cell by using the second information.

In a possible implementation, the third information is carried in downlink control information DCI or a media access control MAC control element CE.

In a possible implementation, the first measurement duration includes one or more of a first duration, a second duration, or a third duration; and within the first duration, the second duration, and the third duration, no physical uplink channel and physical uplink signal is received from the terminal device, and no physical downlink channel and downlink signal is sent to the terminal device.

The first duration is a continuous transmission duration of an RRM measurement reference signal on which the RRM measurement is to be performed, the second duration is a preset duration before a start symbol of the RRM measurement reference signal, and the third duration is a preset duration after an end symbol of the RRM measurement reference signal.

In a possible implementation, the second duration is 140 μs or 500 μs; and the third duration is 140 μs or 500 μs.

In a possible implementation, within the first measurement duration, no physical uplink channel and physical uplink signal is received from the terminal device, and no physical downlink channel and downlink signal is sent to the terminal device.

In a possible implementation, the first measurement duration is the same as a measurement duration of a synchronization information block measurement timing configuration SMTC, and/or the first measurement period is the same as a measurement period of the SMTC.

In a possible implementation, the first measurement duration is less than or equal to 1 millisecond, and the first measurement period is greater than or equal to 40 milliseconds.

In a possible implementation, the first measurement duration and the first measurement period meet any one of the following: the first measurement duration is equal to 1.5 milliseconds, and the first measurement period is equal to 20 milliseconds; the first measurement duration is equal to 1.5 milliseconds, and the first measurement period is equal to 40 milliseconds; the first measurement duration is equal to 1.5 milliseconds, and the first measurement period is equal to 80 milliseconds; and the first measurement duration is equal to 1.5 milliseconds, and the first measurement period is equal to 160 milliseconds.

In a possible implementation, a frequency range corresponding to the first information is the same as a frequency range corresponding to the second information.

According to a third aspect, this application further provides a communication apparatus. The communication apparatus implements any method according to the first aspect. The communication apparatus may be implemented by hardware, or may be implemented by hardware executing corresponding software. The hardware or the software includes one or more units or modules corresponding to the function.

In a possible implementation, the communication apparatus includes a processor. The processor is configured to support the communication apparatus in performing a corresponding function of the terminal device in the method. The communication apparatus may further include a memory. The memory may be coupled to the processor, and the memory stores program instructions and data that are necessary for the communication apparatus. Optionally, the communication apparatus further includes an interface circuit, and the interface circuit is configured to support communication between the communication apparatus and a device such as a network device.

In a possible implementation, the communication apparatus includes corresponding functional modules, respectively configured to implement the steps in the method. The function may be implemented by hardware, or may be implemented by executing corresponding software by hardware. The hardware or the software includes one or more modules corresponding to the function.

In a possible implementation, a structure of the communication apparatus includes a processing unit and a communication unit. These units may perform corresponding functions in the method examples. For details, refer to the descriptions in the method according to the first aspect. Details are not described herein.

According to a fourth aspect, this application further provides a communication apparatus. The communication apparatus implements any method according to the second aspect. The communication apparatus may be implemented by hardware, or may be implemented by hardware executing corresponding software. The hardware or the software includes one or more units or modules corresponding to the function.

In a possible implementation, the communication apparatus includes a processor. The processor is configured to support the communication apparatus in performing a corresponding function of the network device in the method. The communication apparatus may further include a memory. The memory may be coupled to the processor, and the memory stores program instructions and data that are necessary for the communication apparatus. Optionally, the communication apparatus further includes an interface circuit, and the interface circuit is configured to support communication between the communication apparatus and a device such as a terminal device.

In a possible implementation, the communication apparatus includes corresponding functional modules, respectively configured to implement the steps in the method. The function may be implemented by hardware, or may be implemented by executing corresponding software by hardware. The hardware or the software includes one or more modules corresponding to the function.

In a possible implementation, a structure of the communication apparatus includes a processing unit and a communication unit. These units may perform corresponding functions in the method examples. For details, refer to the descriptions in the method according to the second aspect. Details are not described herein.

According to a fifth aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement the method according to either of the first aspect and any possible implementation of the first aspect by using a logic circuit or by executing code instructions.

According to a sixth aspect, a communication apparatus is provided. The communication apparatus includes a processor and an interface circuit. The interface circuit is configured to: receive a signal from another communication apparatus other than the communication apparatus and transmit the signal to the processor, or send a signal from the processor to another communication apparatus other than the communication apparatus. The processor is configured to implement the functional modules of the method according to either of the second aspect and any possible implementation of the second aspect by using a logic circuit or by executing code instructions.

According to a seventh aspect, a computer-readable storage medium is provided. The computer-readable storage medium stores a computer program or instructions, and when the computer program or the instructions is/are executed by a processor, the method according to either of the first aspect and the second aspect and any possible implementation of either of the first aspect and the second aspect is implemented.

According to an eighth aspect, a computer program product storing instructions is provided, and when the instructions are run by a processor, the method according to either of the first aspect and the second aspect and any possible implementation of either of the first aspect and the second aspect is implemented.

According to a ninth aspect, a chip system is provided. The chip system includes a processor, and may further include a memory, configured to implement the method according to either of the first aspect and the second aspect and any possible implementation of either of the first aspect and the second aspect. The chip system may include a chip, or may include a chip and another discrete component.

According to a tenth aspect, a communication system is provided. The system includes the apparatus (for example, the terminal device) according to the third aspect and the apparatus (for example, the network device) according to the fourth aspect.

DESCRIPTION OF EMBODIMENTS

Figure 1:
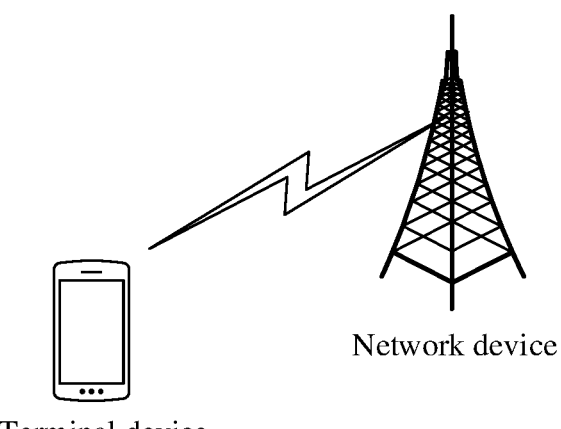
FIG. 1 is a schematic diagram of a network architecture to which an embodiment of this application is applicable.

The following further describes in detail embodiments of this application with reference to accompanying drawings.

The technical solutions in embodiments of this application may be applied to various communication systems, for example, a long term evolution (long term evolution, LTE) system formulated by the 3rd generation partnership project (the 3rd generation partnership project, 3GPP), an NR system, and a next-generation communications system. This is not limited herein.

A terminal device in embodiments of this application may be a device having a wireless transceiver function or a chip that can be disposed in any device, or may also be referred to as user equipment (user equipment, UE), an access terminal, a subscriber unit, a subscriber station, a mobile station, a mobile console, a remote station, a remote terminal, a mobile device, a user terminal, a wireless communication device, a user agent, or a user apparatus. The terminal device in embodiments of this application may be a mobile phone (mobile phone), a tablet computer (Pad), a computer with a wireless transceiver function, a virtual reality (virtual reality, VR) terminal, an augmented reality (augmented reality, AR) terminal, a wireless terminal in industrial control (industrial control), a wireless terminal in self driving (self driving), or the like. A network device may be a next generation NodeB (next Generation NodeB, gNB) in the NR system, an evolved NodeB (evolved NodeB, eNB) in the LTE system, or the like.

The terminal device in this application may be a first-type terminal device or a second-type terminal device. The first-type terminal device and the second-type terminal device may have at least one of the following distinguishing features:

1. Different bandwidth capabilities: The bandwidth capability may be indicated by a maximum bandwidth processing capability of a baseband. For example, a bandwidth supported by the first-type terminal device is not greater than 40 MHz, and a bandwidth supported by the second-type terminal device is greater than 40 MHz. For example, in current NR release-15 (release-15, Rel-15) or NR release-16 (release-16, Rel-16), a bandwidth capability supported by the second-type terminal device is 100 MHz, but a bandwidth capability supported by the first-type terminal device is only 20 MHz in a frequency range 1 (frequency range 1, FR1).

2. Different quantities of transmit and receive antennas: For example, the first-type terminal device may support 2 receive 1 transmit (two receive antennas and one transmit antenna), or 1 receive 1 transmit (one receive antenna and one transmit antenna). The second-type terminal device may support 4 receive 2 transmit (four receive antennas and two transmit antennas).

3. Different maximum uplink transmit powers: For example, a maximum uplink transmit power of the first-type terminal device may be a value in 4 decibel-milliwatts (dBm) to 20 dBm. A maximum uplink transmit power of the second-type terminal device may be 23 dBm or 26 dBm.

4. Different protocol releases: The first-type terminal device may be a terminal device in NR release-17 (release-17, Rel-17) or a release that comes after NR Rel-17. The second-type terminal device may be, for example, a terminal device in NR release-15 (release-15, Rel-15) or NR release-16 (release-16, Rel-16).

5. Different carrier aggregation capabilities: For example, the first-type terminal device does not support carrier aggregation, and the second-type terminal device may support carrier aggregation. For another example, both the first-type terminal device and the second-type terminal device may support carrier aggregation, but a maximum quantity of carriers that can be simultaneously aggregated by the first-type terminal device is less than a maximum quantity of carriers that can be simultaneously aggregated by the second-type terminal device.

6. Different duplex capabilities: For example, the first-type terminal device supports half-duplex frequency division duplex (frequency division duplex, FDD). The second-type terminal device supports full-duplex FDD.

7. Different data processing time capabilities: For example, a minimum delay between receiving downlink data and sending a feedback on the downlink data by the first-type terminal device is greater than a minimum delay between receiving downlink data and sending a feedback on the downlink data by the second-type terminal device, and/or a minimum delay between sending uplink data and receiving a feedback on the uplink data by the first-type terminal device is greater than a minimum delay between sending uplink data and receiving a feedback on the uplink data by the second-type terminal device.

8. Different processing capabilities (ability/capability): For example, a baseband processing capability of the first-type terminal device is lower than a baseband processing capability of the second-type terminal device. The baseband processing capability may include at least one of the following: a maximum quantity of multiple-input multiple-output (multiple-input multiple-output, MIMO) layers supported by the terminal device during data transmission, a quantity of hybrid automatic repeat request (hybrid automatic repeat request, HARQ) processes supported by the terminal device, and a maximum transport block size (transmission block size, TBS) supported by the terminal device.

9. Different uplink and/or downlink peak transmission rates: The peak transmission rate is a maximum data transmission rate that can be reached by the terminal device per unit of time (for example, per second). An uplink peak rate supported by the first-type terminal device may be lower than an uplink peak rate supported by the second-type terminal device, and/or a downlink peak rate supported by the first-type terminal device may be lower than a downlink peak rate supported by the second-type terminal device.

10. Different buffer (buffer) sizes: The buffer may be understood as a total size of a layer 2 (Layer 2, L2) buffer, or the buffer may be understood as a total quantity of soft channel bits that can be used for HARQ processing.

Optionally, the first-type terminal device may be a RED-CAP terminal device. Alternatively, the first-type terminal device may be a low-capability terminal device, a reduced-capability terminal device, REDCAP UE, reduced-capacity UE, narrowband NR (narrowband NR, NB-NR) UE, or the like. The second-type terminal device may be a terminal device with a legacy capability, a normal capability, or a high capability, or may be referred to as a legacy (legacy) terminal device or a normal (normal) terminal device. The second-type terminal device and the first-type terminal device have but are not limited to the distinguishing features.

FIG. 1 is a schematic diagram of a network architecture to which this application is applicable. As shown in FIG. 1, a terminal device may access a network device, to access a service of an external network (for example, a data network (data network, DN)) through the network device, or communicate with another device through the network device, for example, communicate with another terminal device.

Figure 2:
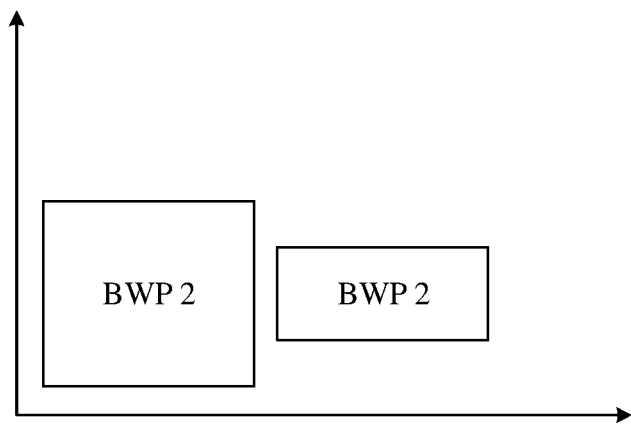
FIG. 2 is a schematic diagram of BWP allocation according to an embodiment of this application.

That FIG. 1 is applied to an NR system is used as an example. In the NR system, the network device may configure a plurality of bandwidth parts (bandwidth part, BWP) for the terminal device. The BWP may include a group of consecutive common resource blocks (common resource block, CRB) that are of a specific carrier and a specific parameter set. A working bandwidth of the terminal device may change dynamically. For example, as shown in FIG. 2, when a traffic volume of the terminal device is large, the network device may configure a BWP (indicated by BWP 1 in FIG. 2) with a large bandwidth for the terminal device, for example, a bandwidth of 40 MHz. When the traffic volume of the terminal device is small, the network device may configure a BWP (indicated by BWP 2 in FIG. 2) with a small bandwidth for the terminal device, for example, a bandwidth of 20 MHz. In this way, a resource can be allocated to the terminal device based on an actual situation, thereby improving resource utilization.

In the NR system, although a plurality of BWPs are configured for the terminal device, there can be only one active BWP (active BWP) at a moment, and the terminal device performs data transmission with the network device by using the active BWP. The data transmission herein includes but is not limited to: receiving downlink data from the network device and sending uplink data to the network device. The downlink data includes data carried on a downlink physical channel, for example, data carried on a physical downlink control channel (physical downlink control channel, PDCCH), data carried on a physical downlink shared channel (physical downlink shared channel, PDSCH), and a downlink signal. The uplink data includes data carried on a physical uplink channel, for example, data carried on a physical uplink control channel (physical uplink control channel, PUCCH), data carried on a physical uplink shared channel (physical uplink shared channel, PUSCH), and an uplink signal.

Figure 3:
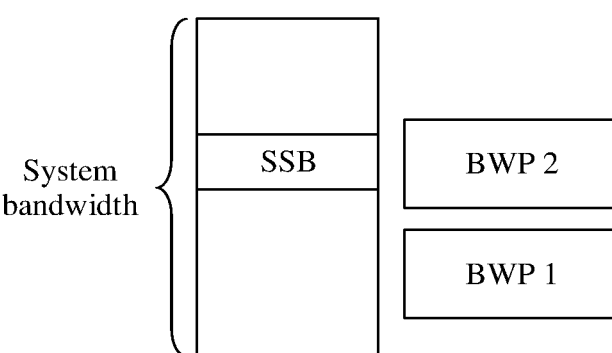
FIG. 3 is a schematic diagram of BWP allocation according to an embodiment of this application.

To monitor communication quality of a serving cell and/or a neighboring cell of the terminal device in real time, the network device may indicate the terminal device to perform RRM measurement based on a measurement configuration, and report an RRM measurement result. That an RRM measurement reference signal is an SSB is used as an example. As shown in FIG. 3, a BWP 1 in FIG. 3 is the active BWP and does not include the SSB, and a BWP 2 includes the SSB. When the terminal device needs to perform the RRM measurement, if the active BWP does not include a to-be-measured SSB, the terminal device needs to interrupt data transmission on the active BWP, and hand over to the BWP 2 to perform the RRM measurement by using an MGP. Performing the RRM by using the MGP may be understood as performing the RRM measurement based on MGP configuration information. Specifically, in the MGP, the terminal device may perform the RRM measurement. Performing the RRM measurement by using the MGP may also be understood as that, in the MGP, the terminal device does not (expect to) send the physical uplink channel and the physical uplink signal to the network device, and does not (expect to) receive the physical downlink channel and the downlink signal from the network device, and in the MGP, the terminal device may perform the RRM measurement.

It should be noted that, if the active BWP includes a to-be-measured RRM measurement signal, for example, the SSB, the terminal device does not need to interrupt the data transmission on the active BWP, and may simultaneously perform the RRM measurement and the data transmission in the active BWP.

The RRM measurement is indispensable measurement of the terminal device, and service continuity of the terminal device can be ensured through the RRM measurement. Therefore, the RRM measurement needs to be frequently performed on the terminal device side. When the active BWP does not include the to-be-measured RRM measurement reference signal, the terminal device needs to hand over to another BWP to perform the RRM measurement. As a result, the data transmission on the active BWP is frequently interrupted. According to a current estimation, because the data transmission is frequently interrupted, about 15% resources on the active BWP cannot be used for the data transmission, thereby reducing data transmission continuity and reducing the resource utilization. This application provides a method, to reduce resource overheads caused by the RRM measurement, ensure data transmission continuity of a low-capability terminal device, and improve flexibility of the RRM measurement. Details are described below.

The network architecture and the service scenario described in this application are intended to describe the technical solutions in this application more clearly, and do not constitute a limitation on the technical solutions provided in this application. A person of ordinary skill in the art may know that, with evolution of the network architecture and emergence of new service scenarios, the technical solutions provided in this application are also applicable to similar technical problems.

In this application, interaction between the network device and the terminal device is used as an example for description. An operation performed by the network device may also be performed by a chip or a module in the network device, and an operation performed by the terminal device may also be performed by a chip or a module in the terminal device.

Figure 4:
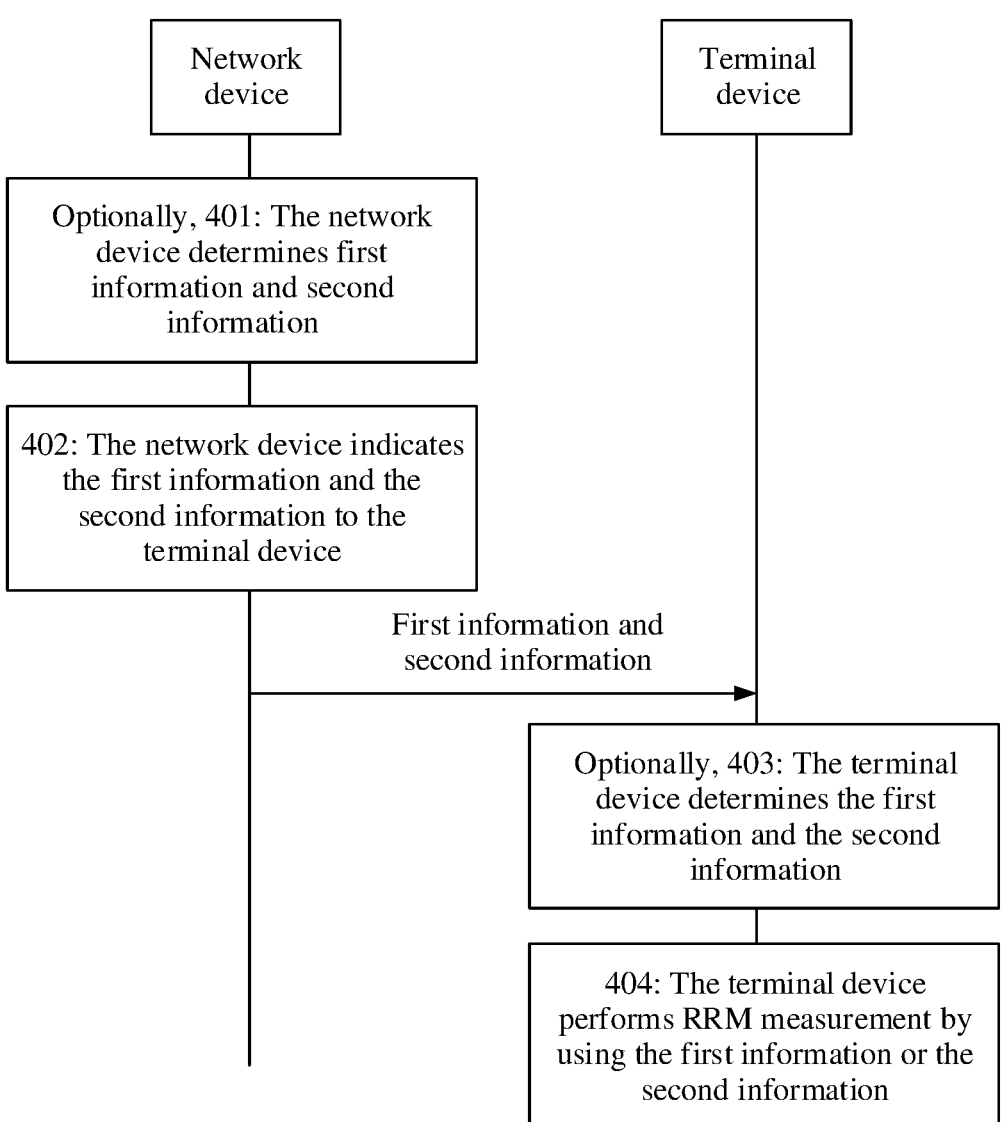
FIG. 4 is a schematic flowchart of a communication method according to an embodiment of this application.

With reference to the foregoing descriptions, FIG. 4 is a schematic flowchart of a communication method according to an embodiment of this application. The method may be applied to a plurality of scenarios, including but not limited to a scenario in which RRM measurement is performed by using an MGP when an active BWP does not include an RRM measurement reference signal. Refer to FIG. 4. The method includes the following steps.

Optionally, S401: A network device determines first information and second information.

The first information includes a first measurement duration and a first measurement period, and the second information includes a second measurement duration and a second measurement period. The first information and the second information may meet any one of the following relationships:

The first measurement duration is less than the second measurement duration;

the first measurement period is greater than the second measurement period; and the first measurement duration is less than the second measurement duration, and the first measurement period is greater than the second measurement period.

Optionally, the first measurement duration and the first measurement period are configuration parameters of a first measurement gap, and the second measurement duration and the second measurement period are configuration parameters of a second measurement gap.

Figure 5:
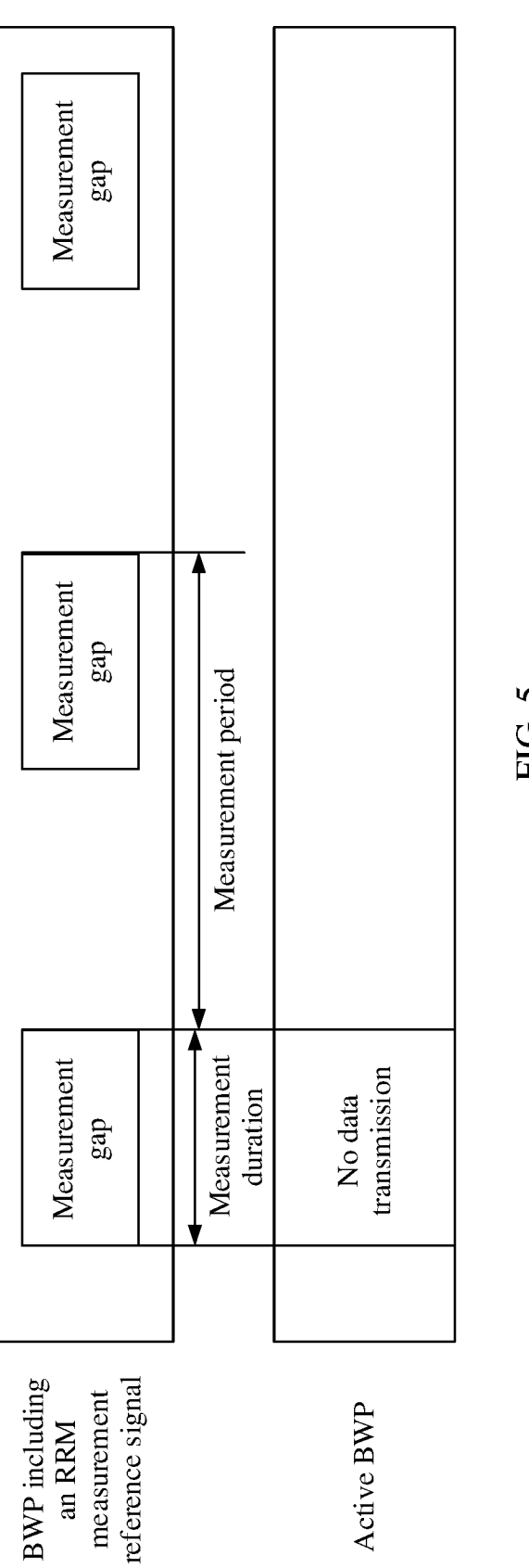
FIG. 5 is a schematic diagram of a measurement gap according to an embodiment of this application.

It should be noted that, in the measurement gap, a terminal device is allowed to perform radio frequency retuning (radio frequency retuning, RF retuning) in an active BWP that does not include an RRM measurement reference signal, to adjust a radio frequency to a BWP that includes the to-be-measured RRM measurement reference signal or adjust the radio frequency to a frequency range that includes the to-be-measured RRM measurement reference signal, so as to complete RRM measurement. As shown in FIG. 5, the measurement gap includes parameters such as a measurement duration and a measurement period.

The BWP or the frequency range that includes the to-be-measured RRM measurement reference signal may be configured by the network device for the terminal device. For example, the network device may indicate, by using a measurement object (measurement objective, MO) configuration, the BWP that includes the to-be-measured RRM measurement reference signal or the frequency range that includes the to-be-measured RRM measurement reference signal. For another example, the network device may configure, by using the MO configuration, frequency information of the to-be-measured RRM measurement reference signal. For example, the network device may configure, by using absolute radio frequency channel number (Absolute Radio Frequency Channel Number, ARFCN) configuration, the frequency information of the to-be-measured RRM measurement reference signal. The RRM measurement reference signal may include but is not limited to an SSB, a CSI-RS, and the like.

In addition, if the measurement gap can be configured based on a granularity of the frequency range (frequency range, FR), in this embodiment of this application, a frequency range corresponding to the first information is the same as a frequency range corresponding to the second information. That is, the terminal device may configure different measurement gaps in a same FR. For example, both the first information and the second information correspond to an FR1 (a frequency range below 6 GHz), both correspond to an FR2 (a frequency range above 6 GHz), or both correspond to another frequency range. For example, if the frequency range supported by the terminal device is the FR1, the first information and the second information determined by the terminal device are used by the terminal device to perform the RRM measurement in a cell in the FR1. If the frequency range supported by the terminal device is the FR2, the first information and the second information determined by the terminal device are used by the terminal device to perform RRM measurement in a cell in the FR2. If the frequency range supported by the terminal device is the FR1 and the FR2, the network device may separately configure, for the terminal device, first information and second information that are used for performing the RRM measurement in the cell in the FR1, and first information and second information used for performing the RRM measurement in the cell in the FR2. Particularly, the first information corresponding to the FR1 may be the same as the first information corresponding to the FR2, and the second information corresponding to the FR1 may be the same as the second information corresponding to the FR2.

Further, the first information may further include a first time offset of the first measurement gap, and the first time offset may be a time offset of a time domain position of the first measurement gap relative to reference timing. For example, the reference timing may be timing information of a serving cell that serves the terminal device, for example, may be a system frame number (system frame number, SFN) of the serving cell that serves the terminal device. The terminal device may determine, based on the first time offset of the first measurement gap, the first measurement duration, and the first measurement period, information such as a radio frame and a slot in which the first measurement gap is located. Correspondingly, the second information may further include a second time offset of the second measurement gap.

In this embodiment of this application, how the network device specifically determines the second information is not limited in this application. The following uses an example to describe how the network device determines the first measurement duration and the first measurement period that are included in the first information.

In a first possible implementation, the first measurement duration belongs to a first duration set, the first duration set includes at least one measurement duration, and the network device may select one measurement duration from the first duration set as the first measurement duration based on an actual situation. The first measurement period belongs to a first period set, the first period set includes a plurality of measurement periods, and the network device may select, as the first measurement period, one measurement period from the first period set based on an actual situation. Similarly, the second measurement duration may correspond to a second duration set, and the second measurement period may correspond to a second period set.

An intersection may exist between the first duration set and the second duration set, or may not exist between the first duration set and the second duration set. An intersection may exist between the first period set and the second period set, or may not exist between the first period set and the second period set. For example, the first duration set is {0.5 ms, 1 ms, 1.5 ms}, and the second duration set is {1.5 ms, 3 ms, 4 ms, 6 ms}. The first period set is {1 ms, 20 ms, 40 ms}, and the second period set is {20 ms, 40 ms, 60 ms, 80 ms}. The first duration set and the second duration set may be the same, that is, the first duration set and the second duration set include same measurement durations. The first period set and the second period set may be the same, that is, the first period set and the second period set include same measurement periods. For example, both the first duration set and the second duration set are {0.5 ms, 1 ms, 2 ms, 3 ms, 3.5 ms, 4 ms, 5.5 ms, 6 ms} or a subset of the set, and both the first period set and the second period set are {20 ms, 40 ms, 80 ms, 160 ms, 320 ms, 640 ms} or a subset of the set.

Optionally, when the second measurement duration and the second measurement period are the configuration parameters of the second measurement gap, because a minimum value of the measurement duration of the current measurement gap is 1.5 ms, and a minimum value of the measurement period is 20 ms, to ensure that the first measurement duration is less than the second measurement duration, and the first measurement period is greater than the second measurement period, in this embodiment of this application, the first measurement duration may be less than or equal to 1 ms, and the first measurement period may be greater than or equal to 40 ms.

In a second possible implementation, the first measurement duration or the first measurement period included in the first information may reuse a measurement duration and a measurement period of another measurement gap. For example, a plurality of gap patterns (gap patterns) may be predefined, and each gap pattern corresponds to an identifier, a measurement duration, and a measurement period. When the first information is configured, an identifier of a gap pattern may be directly indicated, which indicates that the first measurement duration and the first measurement period of the first information are configured as a measurement duration and a measurement period corresponding to the identifier.

For example, predefined gap patterns are shown in Table 1. In Table 1, a first column indicates identifiers of the gap patterns, a second column indicates measurement durations corresponding to the identifiers, and a third column indicates measurement periods corresponding to the identifiers.

TABLE 1

| Identifier | Measurement duration (ms) | Measurement period (ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |
| 24 | 10 | 80 |
| 25 | 20 | 160 |

In this embodiment of this application, to make the first measurement duration be less than the second measurement duration, one or more gap patterns with minimum measurement durations in Table 1 may be used as candidate configurations of the first measurement gap.

For example, gap patterns corresponding to identifiers 20 to 23 in Table 1 are used as an example. On the one hand, the identifiers 20 to 23 correspond to minimum measurement durations. On the other hand, the gap patterns corresponding to the identifiers 20 to 23 are applied only to the FR 2. Therefore, one or more gap patterns in the identifiers 20 to 23 in Table 1 may be used as the candidate configuration of the first measurement gap, and the first measurement gap may correspond to the FR 1, or may correspond to the FR 2. In this way, it can be ensured that the first duration of the first measurement gap is the smallest, and the existing gap pattern may be reused. In this case, the first measurement duration and the first measurement period may meet any one of the following:

The first measurement duration is equal to 1.5 milliseconds, and the first measurement period is equal to 20 milliseconds;

the first measurement duration is equal to 1.5 milliseconds, and the first measurement period is equal to 40 milliseconds;

the first measurement duration is equal to 1.5 milliseconds, and the first measurement period is equal to 80 milliseconds; and the first measurement duration is equal to 1.5 milliseconds, and the first measurement period is equal to 160 milliseconds.

Optionally, a new gap pattern may be added to the existing table, and the newly added gap pattern is used as the candidate configuration of the first measurement gap. For example, a measurement duration corresponding to the newly added gap pattern may be less than or equal to 1 millisecond, and a measurement period may be greater than or equal to 40 milliseconds. An identifier corresponding to the newly added gap pattern is greater than 25.

Optionally, a gap pattern used by the terminal device may be all the gap patterns included in Table 1, a subset pattern of all the gap patterns included in Table 1, or all the gap patterns or some gap patterns that are included in Table 1 and that are combined with the newly added gap pattern.

In a third possible implementation, the first measurement duration and the first measurement period may be determined based on a synchronization information block measurement timing configuration (SSB measurement timing configuration, SMTC).

For example, the terminal device may determine the first measurement duration and the first measurement period based on an SMTC corresponding to frequency information of an RRM measurement reference signal corresponding to the serving cell. Specifically, the frequency information of the RRM measurement reference signal may be determined by using the ARFCN, and an SMTC corresponding to the ARFCN is used to determine the first measurement duration and the first measurement period. A measurement period of the SMTC is equal to the first measurement period, and a measurement duration (window length) of the SMTC is equal to first measurement duration. It should be noted that the SMTC is used to search for the SSB. In most cases, the SSB is not continuous in time domain, and the terminal device does not need to continuously search and measure in the time domain when performing the measurement provided that a time window in which the SSB is located can be locked. Therefore, the concept of the SMTC is introduced into the measurement configuration. The SMTC appears in a specific period in the time domain, and the duration is a fixed measurement window. The measurement period ranges from 5 ms to 160 ms, and the window length ranges from 1 ms to 5 ms. From a measurement perspective, the terminal device considers that no SSB exists outside the window. The network device may configure the measurement period and the window length of the SMTC by using the measurement object (measurement object, MO). Usually, the SMTC configuration is configured per (per) frequency, that is, each frequency corresponds to one SMTC configuration. In view of this, the terminal device may use an SMTC configuration (for example, an SMTC configuration corresponding to the frequency information of the RRM measurement reference signal corresponding to the serving cell) corresponding to a specific frequency as the configuration of the first measurement gap. Alternatively, it may be understood that, in view of this, the terminal device may determine the first measurement duration and the first measurement period. Based on the implementation, signaling overheads of configuring the first measurement gap by the network device can be reduced.

S402: The network device indicates the first information and the second information to a terminal device.

The first information and the second information may be carried in radio resource control (radio resource control, RRC) signaling, and the first information and the second information may be located in same RRC signaling. For example, the network device may send the RRC signaling including the first information and the second information to the terminal device. The RRC signaling may be, for example, an information element (information element, IB) MeasGapConfig.

It should be noted that, in addition to being configured by using the RRC signaling, the first information and the second information may also be configured by using signaling of another type such as DCI. Examples are not provided one by one herein.

In a possible implementation, the network device may directly indicate the second measurement duration and the second measurement period that are included in the second information. For example, the network device may send the second information. Specifically, the second information sent by the network device may be shown as follows:

```
GapConfig:
{
    gapoffset;
    mgl;
    mgrp;
};
``` gapoffset indicates a second time offset, and may be a time offset of a time domain position of the second measurement gap relative to the reference timing. For example, the reference timing may be the timing information of the serving cell that serves the terminal device, or may be timing information of a non-serving cell of the terminal device. The non-serving cell of the terminal device may be a non-serving cell determined by the terminal device by detecting the SSB, or may be a non-serving cell, for example, a neighboring cell neighboring cell, configured by the network device. mgl indicates the second measurement duration, and indicates a measurement gap length of the second measurement gap, and a unit is millisecond (ms). mgrp indicates the second measurement period, and indicates a measurement gap repetition period of the second measurement interval, and a unit is ms.

In addition to the foregoing information, GapConfig may further include other information. This is not specifically limited.

The network device may directly indicate the first measurement duration and the first measurement period that are included in the first information, or may indirectly indicate the first measurement duration or the first measurement period. For the network device directly indicating the first measurement duration and the first measurement period, refer to the description of the second information. When the network device indirectly indicates the first measurement duration, the first measurement duration and the second measurement duration may be configured to a same value, but the network device indicates only the second measurement duration, that is, the second measurement duration may be reused for the first measurement duration. Similarly, when the network device indirectly indicates the first measurement period, the first measurement period and the second measurement period may be configured to a same value, but the network device indicates only the second measurement period.

For example, with reference to the second information in the foregoing example, when the network device directly indicates the first measurement duration, the first information and the second information sent by the network device may be shown as follows:

```
GapConfig1:
{
    gapoffset;
    mgl;
    mgrp;
};
GapConfig2:
{
    gapoffset;
    mgl;
    mgrp;
};
```

It is assume that GapConfig1 corresponds to the first information, gapoffset included in GapConfig1 indicates the first time offset, mgl indicates the first measurement duration, and mgrp indicates the first measurement period.

For example, with reference to the second information in the foregoing example, when the network device indirectly indicates the first measurement duration, the first information sent by the network device may be shown as follows:

```
GapConfig1:
{
    gapoffset;
    mgrp;
};
GapConfig2:
{
    gapoffset;
    mgl;
    mgrp;
};
```

In other words, it is still assumed that GapConfig1 corresponds to the first information, or GapConfig1 does not include the IE mgl, or includes mgl, but an invalid value is configured for mgl.

In the foregoing example, the first information does not include the first measurement duration. The terminal device may determine the first measurement period based on the first information, and then determine the first measurement duration based on the second information.

For another example, with reference to the second information in the foregoing example, when the network device indirectly indicates the first measurement period, the first information sent by the network device may be shown as follows:

```
GapConfig1:
{
    gapoffset;
    mgl;
};
GapConfig2:
{
    gapoffset;
    mgl;
    mgrp;
};
```

In other words, it is still assumed that GapConfig1 corresponds to the first information, or GapConfig1 does not include the IE mgrp, or includes mgrp, but an invalid value is configured for mgrp.

In the foregoing example, the first information does not include the first measurement period, and the terminal device may determine the first measurement duration based on the first information, and then determine the first measurement period based on the second information.

In another possible implementation, when the first measurement duration is equal to the measurement duration of the SMTC, and/or the first measurement period is equal to the measurement period of the SMTC, the network device may not send the first information, but indicate the terminal device to determine the first information based on the SMTC.

The foregoing is merely examples. Alternatively, the network device may indicate the first information and the second information in another manner. Examples are not provided one by one herein.

Optionally, S403: The terminal device determines the first information and the second information.

For details about how the terminal device determines the second information, details are not described herein. For details, refer to the conventional technology.

There may be a plurality of manners for specifically determining the first information by the terminal device. Implementation 1: When the network device directly indicates the first information, the network device may send the first information in manners, for example, by using the RRC signaling. In this case, the terminal device may receive the first information from the network device, to obtain the first measurement duration and the first measurement period that are included in the first information.

Implementation 2: When the network device directly indicates the first information, the first information includes the first measurement duration or the first measurement period. The terminal device may determine the first measurement duration based on the received first information, and then determine the first measurement period based on the second information. Alternatively, the terminal device may determine the first measurement period based on the received first information, and then determine the first measurement duration based on the second information.

For example, the first information received by the terminal device includes the first measurement duration, but does not include the first measurement period. In this case, the terminal device may consider that the first measurement period is equal to the second measurement period in the second information, to determine the first measurement period based on the second measurement period.

Implementation 3: When the network device indicates the terminal device to determine the first information based on the SMTC, the terminal device may use a measurement duration (window length) and a measurement period of an SMTC that corresponds to a specific frequency, for example, the window length and the period of the SMTC corresponding to the frequency information of the RRM measurement reference signal corresponding to the serving cell, as the first measurement duration and the first measurement period. The specific frequency may be a frequency configured by the network device, may be a default frequency, or may be a frequency independently determined by the terminal device. This is not limited in this embodiment of this application.

S404: The terminal device performs the RRM measurement by using the first information or the second information.

Optionally, when the method is applied to the scenario in which the RRM measurement is performed by using the MGP, before performing the RRM measurement, the terminal device may further determine that the active BWP does not include the RRM measurement reference signal. When the active BWP does not include the RRM measurement reference signal, the terminal device may perform the RRM measurement by using the first information or the second information. That the RRM measurement reference signal is not included means that an RRM measurement reference signal configured for the terminal device is not included.

In the method, a plurality of measurement durations and measurement periods are configured for the terminal device, and the terminal device may perform measurement by using different measurement durations and measurement periods in different cases to improve flexibility of the RRM measurement.

In this embodiment of this application, how the terminal device specifically performs the RRM measurement by using the first information or the second information is not limited in this application. For example, when performing the RRM measurement on a first-type cell, the terminal device uses the first measurement period and/or the first measurement duration; and when performing the RRM measurement on a second-type cell, the terminal device uses the second measurement period and the second measurement duration.

In a possible implementation, the terminal device performs the RRM measurement on a serving cell by using the first information, and performs the RRM measurement on a non-serving cell by using the second information. In other words, the first-type cell includes the serving cell that serves the terminal device; and the second-type cell includes the non-serving cell. The non-serving cell is a cell other than the serving cell, including but not limited to a neighboring cell of the serving cell.

In another possible implementation, in addition to performing the RRM measurement on the serving cell by using the first information, the RRM measurement may be further performed on a cell in a first non-serving cell set by using the first information. The first non-serving cell set includes at least one non-serving cell, and there is a fixed timing difference between timing information of all the non-serving cell included in the first non-serving cell set and timing information of the serving cell. In other words, for the non-serving cell in the first non-serving cell set, the terminal device may determine the timing information of the non-serving cell based on the timing information of the serving cell. Instead, time and position information of an RRM measurement reference signal in the non-serving cell does not need to be detected in a blind detection manner, to determine the timing information of the non-serving cell. It should be noted that, that there is the fixed timing difference from the timing information of the serving cell may be understood as that the terminal device may determine the timing information of the non-serving cell based on the timing information of the serving cell. For example, the terminal device may consider that an SFN of the serving cell is the same as an SFN of the non-serving cell with the fixed timing difference, or the terminal device may consider that SSB index information of the non-serving cell with the fixed timing difference can be derived based on the timing information of the serving cell.

In addition, the terminal device performs the RRM measurement on a cell in a second non-serving cell set by using the second information. The second non-serving cell set includes at least one non-serving cell, and there is no fixed timing difference between timing information of all the non-serving cell included in the second non-serving cell set and the timing information of the serving cell. In other words, for the non-serving cell in the second non-serving cell set, the terminal device is unknown to the timing information of the non-serving cell, and the terminal device needs to detect time and position information of an RRM measurement reference signal in the non-serving cell in a blind detection manner, to determine the timing information of the non-serving cell.

With reference to the foregoing descriptions, in the implementation, the first-type cell includes the serving cell and the non-serving cell that has the fixed timing difference from the timing information of the serving cell, or the first-type cell includes the serving cell and the non-serving cell that can determine the timing information of the cell based on the timing information of the serving cell. The second-type cell includes the non-serving cell that does not have the fixed timing difference from the timing information of the serving cell, or the second-type cell includes the non-serving cell that cannot determine the timing information of the cell based on the timing information of the serving cell.

According to the method, the timing information of the first-type cell can be obtained in advance, and does not need to be obtained in the blind detection manner, and compared with the second-type cell, time for performing the RRM measurement by the terminal device can be reduced. Therefore, when the RRM measurement is performed on the first-type cell, the first measurement duration for performing the RRM measurement may be less than the second measurement duration for performing the RRM measurement on the second-type cell; and/or when the RRM measurement is performed on the first-type cell, the first measurement period in which the RRM measurement is performed may be greater than the second measurement period in which the RRM measurement is performed on the second-type cell.

Based on this, in this embodiment of this application, by setting different measurement durations and/or measurement periods for different types of cells, the RRM measurement may be completed by using measurement durations and measurement periods suitable for different scenarios. This reduces measurement overheads. In addition, when the active BWP does not include a to-be-measured SSB, a shorter measurement duration and/or a larger measurement period may be configured, to reduce impact of interruption on data transmission on the active BWP.

It should be noted that the terminal device may perform the RRM measurement on the first-type cell by using the first information, and perform the RRM measurement on the second-type cell by using the second information, and additional signaling notification may not be needed. In other words, when determining that the first measurement duration is less than the second measurement duration, and/or the first measurement period is greater than the second measurement period, the terminal device may perform, by default, the RRM measurement on the first-type cell within the first measurement duration based on the first measurement period; and perform the RRM measurement on the second-type cell within the second measurement duration based on the second measurement period. When the first-type cell includes the non-serving cell, a cell identifier of the non-serving cell included in the first-type cell may be notified by the network device to the terminal device. For example, the network device may indicate, to the terminal device by using the RRC signaling, the cell identifier of the non-serving cell included in the first-type cell.

Optionally, the terminal device may preferentially perform the RRM measurement on the first-type cell by using the first information, and when determining that a measurement result of performing the RRM measurement on the first-type cell meets a preset condition, the terminal device performs the RRM measurement on the second-type cell by using the second information. The preset condition may be that a measurement result obtained in at least one first measurement period within a preset time range is less than a preset threshold. In this case, if the measurement result is a measurement result of performing the RRM measurement on the serving cell, it may be understood that quality of service of the terminal device in the current serving cell deteriorates. If the measurement result of performing the RRM measurement on the non-serving cell in the first-type cell is further included, it may be further understood that a non-serving cell whose timing information can be determined is not suitable to be used as a candidate serving cell. In this case, the terminal device needs to perform the RRM measurement on the second-type cell by using the second information, and determine, by detecting a measurement result of the RRM measurement on the second-type cell, whether a cell that may be used as the candidate serving cell of the terminal device exists, to ensure data transmission continuity.

It should be noted that, in this embodiment of this application, the measurement result of the RRM measurement includes one or more of a reference signal received power (reference signal received power, RSRP) measurement result, a reference signal received quality (reference signal received quality, RSRQ) measurement result, or a signal interference noise ratio (signal interference noise ratio, SINR) measurement result. The measurement result of the RRM measurement may be implemented based on the SSB, or may be implemented based on another reference signal such as the CSI-RS. When implemented based on the SSB, the RRM measurement may be performed based on one or more of a primary synchronization signal (primary synchronization signal, PSS) a secondary synchronization signal (secondary synchronization signal, SSS), or a demodulation reference signal (demodulation reference signal, DMRS) used to demodulate a physical broadcast channel (physical broadcast channel, PBCH) included in the SSB.

Optionally, in this embodiment of this application, the terminal device may further report, through aperiodic or periodic measurement, the measurement result of performing the RRM measurement on the first-type cell by using the first information, or the terminal device may directly send trigger request information to the network device. The trigger request information is used to request to use the second information to perform the RRM measurement.

The network device may send third information to the terminal device. The third information indicates to perform the RRM measurement by using the second information. Further, the third information may indicate to use the second information to perform the RRM measurement on the second-type cell.

The third information may be sent when the network device determines that the measurement result reported by the terminal device through the aperiodic or periodic measurement is less than the preset threshold. Alternatively, the third information may be sent after the network device receives the trigger request information from the terminal device. Alternatively, the third information may be sent in another case. This is not limited in this embodiment of this application.

The third information may be carried in physical layer signaling, downlink control information (downlink control information, DCI), or a medium access control (medium access control, MAC) control element (control element, CE). It should be noted that the third information is not carried in an RRC reconfiguration message, but is carried in the physical layer signaling, the DCI, or the MAC CE that is transmitted faster than the RRC reconfiguration message. In this way, impact of the measurement gap on data transmission of the active BWP is reduced, and when the quality of service of the serving cell deteriorates, the RRM measurement on more non-serving cells by using the second information can be quickly started, thereby quickly determining a possible candidate cell. In this case, optionally, when the network device configures the first information and the second information, effective time of the second measurement duration and the second measurement period included in the second information may be indicated by the network device by using the MAC CE or the DCI.

Optionally, the third information may also be indicated by using the RRC signaling.

In addition, the terminal device may preferentially perform the RRM measurement on the first-type cell by using the first information, and when determining that the measurement result of performing the RRM measurement on the first-type cell meets the preset condition, the terminal device performs the RRM measurement on the second-type cell by using the second information. In addition, by using an uplink data transmission channel between the network device and a base station, the network device is notified of performing the RRM measurement by using the second information, so that the network device avoids performing data transmission with the terminal device within the second measurement duration and the second measurement period corresponding to the following second information. The uplink data transmission channel may be a PUCCH or a PUSCH, which is not specifically limited.

It should be noted that, in addition to performing the RRM measurement on the second-type cell by using the second information, the terminal device may perform the RRM measurement on the first-type cell by using the second information. In this way, when determining that the measurement result obtained by performing the RRM measurement in the serving cell is better than the measurement result obtained by performing the RRM measurement in the non-serving cell, the terminal device may perform the RRM measurement on the first-type cell by reusing the first information.

Figure 6:
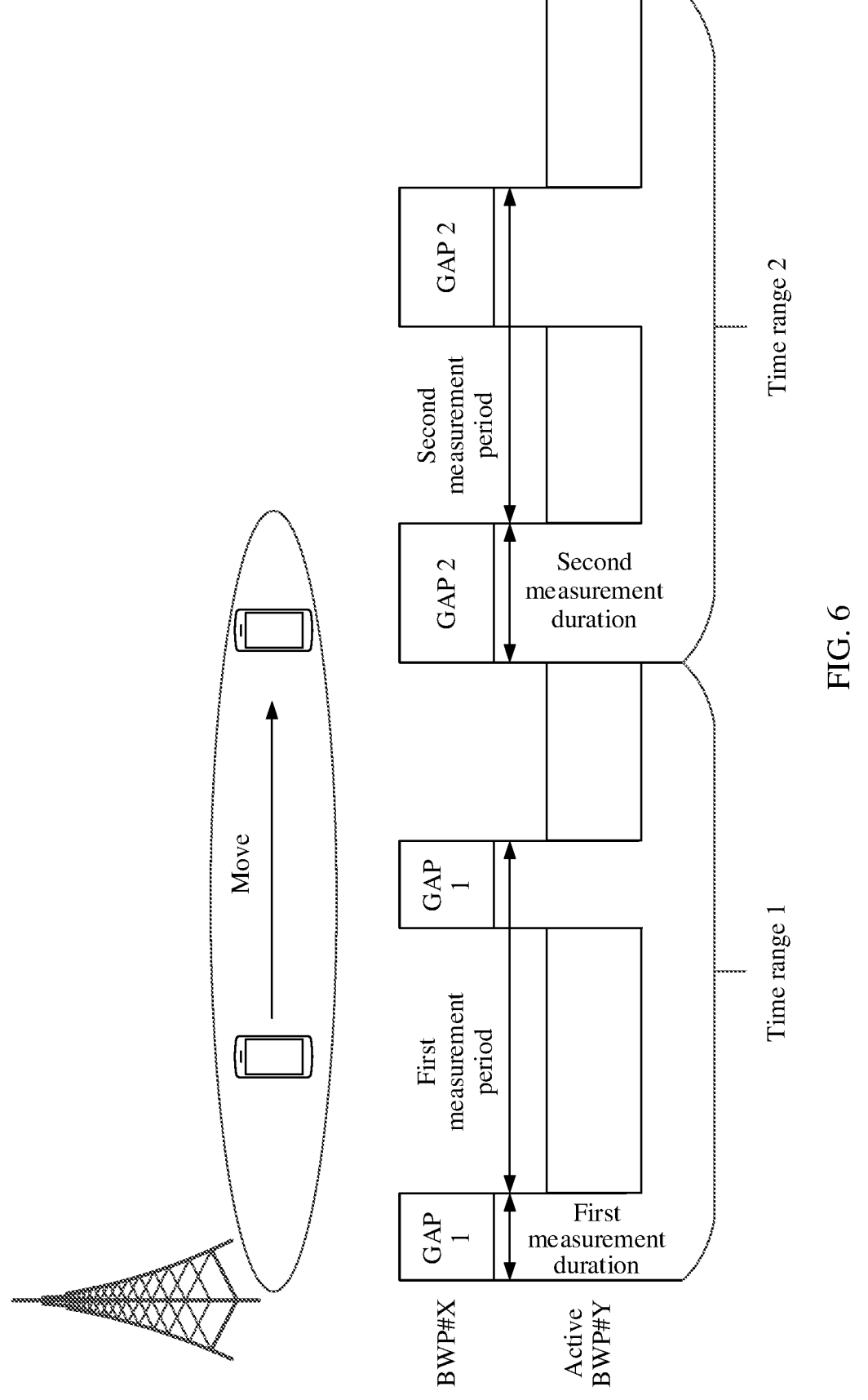
FIG. 6 is a schematic diagram of an application scenario according to an embodiment of this application.

The following provides a specific application scenario to describe a situation in which the terminal device may first perform the RRM measurement by using the first information, and then perform the RRM measurement by using the second information. For example, as shown in FIG. 6, in this example, a network device configures first information and second information, and the first information may be a measurement duration and a measurement period that are configured for a first measurement gap (a GAP 1 in FIG. 6). The second information may be a measurement duration and a measurement period that are configured for a second measurement gap (for example, a GAP 2 in FIG. 6). In FIG. 6, a terminal device moves from a center of a serving cell to an edge of the serving cell. In a moving process, the terminal device performs RRM measurement by using different measurement durations and/or measurement periods. Specifically, when being at the center of the serving cell, the terminal device may first perform the RRM measurement on the serving cell by using the first information, and an RRM measurement result may be RSRP, RSRQ, or another measurement result. Within a time range 1 shown in FIG. 6, because an active BWP (BWP #Y in FIG. 6) of the terminal device does not include an RRM measurement reference signal, the terminal device needs to interrupt data transmission on the current active BWP #Y based on the GAP 1, and hand over to a frequency resource (for example, BWP #X in FIG. 6) that includes the RRM measurement reference signal, to complete the RRM measurement. Within the time range 1, as the terminal device gradually moves from the center of the serving cell to the edge of the serving cell, the RRM measurement result gradually deteriorates. In this case, to ensure validity of a possible cell handover, starting from a time range 2, the terminal device starts to perform the RRM measurement on a non-serving cell, or on the serving cell and the non-serving cell by using the second information. The second measurement duration corresponding to the GAP 2 is greater than the first measurement duration corresponding to the GAP 1, which helps the terminal device detect more non-serving cells and select a proper cell in a following handover process. The use of the second information by the terminal device may be activated by the network device, or the terminal device may directly use the second information, and then notify the network device by using an uplink data transmission channel, to start to perform the RRM measurement by using the second information.

Optionally, in the implementation of this application, behavior of the terminal device within the first measurement duration may be restricted, so that impact of the behavior of the terminal device on the RRM measurement is reduced, and accuracy of the RRM measurement is improved. In other words, the terminal device performs the RRM measurement within the first measurement duration in the following manner:

In a first implementation, when a current active BWP of the terminal device does not include a to-be-measured RRM measurement reference signal, the first measurement duration may include one or more of a first duration, a second duration, or a third duration. Within the first duration, the second duration, and the third duration, the terminal device does not (expect to) send a physical uplink channel and a physical uplink signal to the network device, and does not (expect to) receive a physical downlink channel and a downlink signal from the network device.

The first duration is a continuous transmission duration of the RRM measurement reference signal on which the RRM measurement is to be performed, the second duration is a preset duration before a start symbol of the RRM measurement reference signal, and the third duration is a preset duration after an end symbol of the RRM measurement reference signal. The preset duration may be less than or equal to 1 ms, for example, may be 140 microseconds (µs), 500 µs, or may be one orthogonal frequency division multiplexing (orthogonal frequency division multiplexing, OFDM) symbol. Alternatively, the preset duration may be less than or equal to a minimum duration required by the terminal device to perform RF retuning. Specific values of the second duration and the third duration are not limited. For example, the second duration is 140 µs, 500 µs, or one OFDM symbol. The third duration is 140 µs, 500 µs, or one OFDM symbol. The values of the second duration and the third duration may be the same or different. One first measurement duration may include one or more first durations, may include one or more second durations, or may include one or more third durations. This is not specifically limited.

The physical uplink channel herein includes a physical uplink control channel (physical uplink control channel, PUCCH) and a physical uplink shared channel (physical uplink shared channel, PUSCH). The physical uplink signal includes a sounding reference signal (sounding reference signal, SRS). The physical downlink channel includes a physical downlink control channel (physical downlink control channel, PDCCH), a physical downlink shared channel (physical downlink shared channel, PDSCH), a tracking reference signal (tracking reference signal, TRS), and a CSI-RS for channel quality information (channel quality information, CQI) measurement.

In a second implementation, when a current active BWP of the terminal device does not include a to-be-measured RRM measurement reference signal, within a time range corresponding to the first measurement duration, the terminal device does not (expect to) send a physical uplink channel and a physical uplink signal to the network device, and does not (expect to) receive a physical downlink channel and a downlink signal from the network device.

Figure 7:
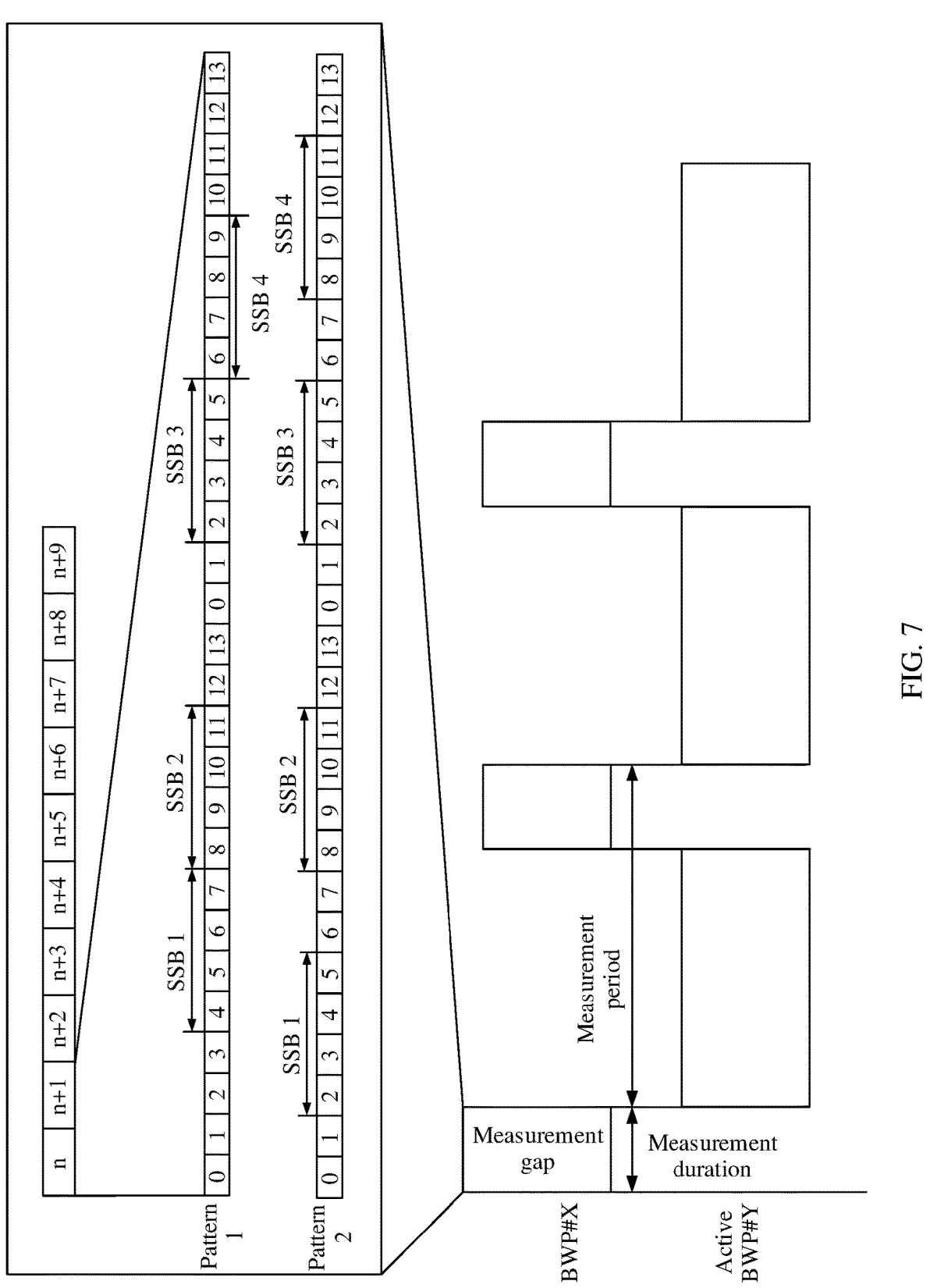
FIG. 7 is a schematic diagram of a structure of a first measurement duration according to an embodiment of this application.

With reference to the first implementation and the second implementation, the following describes, by using a specific example, the first duration, the second duration, and the third duration included within the first measurement duration. For example, as shown in FIG. 7, it is assumed that four SSBs used for the RRM measurement are included within the first measurement duration, and time distribution of the SSBs meets a pattern 1 (a pattern 1 shown in FIG. 7). Specifically, OFDM symbols occupied by an SSB 1 are symbols whose OFDM symbol indexes are 4 to 7 and that are included in a slot n (slot n) in FIG. 7, OFDM symbols occupied by a SIB 2 are symbols whose OFDM symbol indexes are 8 to 11 and that are included in the slot n (slot n) in FIG. 7, OFDM symbols occupied by a SIB 3 are symbols whose OFDM symbol indexes are 2 to 5 and that are included in a slot n+1 (slot n+1) in FIG. 7, and OFDM symbols occupied by a SIB 4 are symbols whose OFDM symbol indexes are 6 to 9 and that are included in the slot n+1 (slot n+1) in FIG. 7.

With reference to FIG. 7, when the first implementation is used, when the terminal device performs the RRM measurement in the slot n, within symbols (first duration) whose OFDM symbol indexes are 4 to 11 and that are included in the slot n, a preset duration (second duration) before a symbol whose OFDM symbol index is 4, and a preset duration (third duration) after a symbol whose OFDM symbol index is 11; and when the terminal device performs the RRM measurement in the slot n+1, within symbols (first duration) whose OFDM symbol indexes are 2 to 9 and that are included in the slot n+1, a preset duration (second duration) before a symbol whose OFDM symbol index is 2, and a preset duration (third duration) after a symbol whose OFDM symbol index is 9, the terminal device does not (expect to) send the physical uplink channel and the physical uplink signal to the network device, and does not (expect to) receive the physical downlink channel and the downlink signal from the network device.

When the second implementation is used, on all OFDM symbols (that is, all OFDM symbols included in the slot n and the slot n+1) included within the first measurement duration, the terminal device does not (expect to) send the physical uplink channel and the physical uplink signal to the network device, and does not (expect to) receive the physical downlink channel and the downlink signal from the network device.

For another example, as shown in FIG. 7, four SSBs used for the RRM measurement are included within the first measurement duration, and time distribution of the SSBs meets a pattern 2. OFDM symbols occupied by an SSB 1 in the pattern 2 are symbols whose OFDM symbol indexes are 2 to 5 and that are included in a slot n (slot n) in FIG. 7, OFDM symbols occupied by a SIB 2 are symbols whose OFDM symbol indexes are 8 to 11 and that are included in the slot n (slot n) in FIG. 7, OFDM symbols occupied by a SIB 3 are symbols whose OFDM symbol indexes are 2 to 5 and that are included in a slot n+1 (slot n+1) in FIG. 7, and OFDM symbols occupied by a SIB 4 are symbols whose OFDM symbol indexes are 8 to 11 and that are included in the slot n+1 (slot n+1) in FIG. 7.

With reference to FIG. 7, when the first implementation is used, within the symbols (first duration) whose OFDM symbol indexes are 2 to 5 and that are included in the slot n, a preset duration (second duration) before a symbol whose OFDM symbol index is 2, a preset duration (third duration) after a symbol whose OFDM symbol index is 5, the symbols (first duration) whose OFDM symbol indexes are 8 to 11 and that are included in the slot n, a preset duration (second duration) before a symbol whose OFDM symbol index is 8, a preset duration (third duration) after a symbol whose OFDM symbol index is 11, the symbols (first duration) whose OFDM symbol indexes are 2 to 5 and that are included in the slot n+1, a preset duration (second duration) before a symbol whose OFDM symbol index is 2, a preset duration (third duration) after a symbol whose OFDM symbol index is 5, the symbols (first duration) whose OFDM symbol indexes are 8 to 11 and that are included in the slot n+1, a preset duration (second duration) before a symbol whose OFDM symbol index is 8, and a preset duration (third duration) after a symbol whose OFDM symbol index is 11, the terminal device does not (expect to) send the physical uplink channel and the physical uplink signal to the network device, and does not (expect to) receive the physical downlink channel and the downlink signal from the network device. Alternatively, within symbols (first duration) whose OFDM symbol indexes are 2 to 11 and that are included in the slot n, a preset duration (second duration) before the symbol whose OFDM symbol index is 2, a preset duration (third duration) after the symbol whose OFDM symbol index is 11, symbols (first duration) whose OFDM symbol indexes are 2 to 11 and that are included in the slot n+1, a preset duration (second duration) before the symbol whose OFDM symbol index is 2, and a preset duration (third duration) after the symbol whose OFDM symbol index is 11, the terminal device does not (expect to) send the physical uplink channel and the physical uplink signal to the network device, and does not (expect to) receive the physical downlink channel and the downlink signal from the network device.

When the second implementation is used, on all OFDM symbols (that is, all OFDM symbols included in the slot n and the slot n+1) included within the first measurement duration, the terminal device does not (expect to) send the physical uplink channel and the physical uplink signal to the network device, and does not (expect to) receive the physical downlink channel and the downlink signal from the network device.

It should be noted that, in the first implementation, the first duration may correspond to the duration corresponding to the SSBs that are continuously distributed in terms of time. For example, in FIG. 7, when the time distribution of the SSBs meets the pattern 1, the first duration corresponds to the OFDM symbols whose OFDM symbol indexes are 4 to 11 and that are included in the slot n, and the first duration further corresponds to the OFDM symbols whose OFDM symbol indexes are 2 to 9 and that are included in the slot n+1. It can be observed that, in this case, the first measurement duration may include a plurality of first durations. Alternatively, when the time distribution of the SSBs in FIG. 7 meets the pattern 2, the first duration corresponds to the OFDM symbols whose OFDM symbol indexes are 2 to 5 and that are included in the slot n, also corresponds to the OFDM symbols whose OFDM symbol indexes are 8 to 11 and that are included in the slot n, also corresponds to the OFDM symbols whose OFDM symbol indexes are 2 to 5 and that are included in the slot n+1, and also corresponds to the OFDM symbols whose OFDM symbol indexes are 8 to 11 and that are included in the slot n+1. Alternatively, to simplify implementation of the terminal device, the first duration may correspond to the OFDM symbols whose OFDM symbol indexes are 2 to 11 and that are included in the slot n, and also correspond to the OFDM symbols whose OFDM symbol indexes are 2 to 11 and that are included in the slot n+1.

With reference to the foregoing descriptions, it can be learned that, in this embodiment of this application, the terminal device may determine the first information and the second information, and perform the RRM measurement by using the first information or the second information.

The first measurement duration included in the first information is less than the second measurement duration included in the second information, and/or the first measurement period included in the first information is greater than the second measurement period included in the second information. In the implementation, different measurement configurations may adapt to different measurement scenarios, thereby reducing data transmission discontinuity caused by the measurement configuration, and ensuring data transmission performance. Optionally, when the first measurement duration included in the first information is in a first duration set, and the second measurement duration included in the second information is in a second duration set, an implementation in which the first measurement duration is less than the second measurement duration is that a measurement duration selected from the first duration set as the first measurement duration is less than a measurement duration selected from the second duration set as the second measurement duration; and another implementation is that at least one measurement duration included in the first measurement duration set is less than all measurement durations included in the second measurement duration set. Optionally, when the first measurement period included in the first information is located in a first period set, and the second measurement period included in the second information is in a second period set, an implementation in which the first measurement period is greater than the second measurement period is that a measurement period selected from the first period set as the first measurement period is greater than a measurement period selected from the second period set as the second measurement period; and another implementation is that at least one measurement period included in the first period set is greater than all measurement periods included in the second period set.

In this embodiment of this application, the first information and the second information may be further applied in another manner. In an implementation, the first information and the second information correspond to different types of reference signals. Specifically, the first measurement period and/or the first measurement duration are/is used when the RRM measurement is performed based on a first-type reference signal, and the second measurement period and/or the second measurement duration are/is used when the RRM measurement is performed based on a second-type reference signal.

In this embodiment of this application, different types of reference signals may include at least one of the following differences:

1. Reference signals are different. For example, the SSB is the first-type reference signal, and the CSI-RS is the second-type reference signal.

2. Reference signals are the same, but distributed time domain densities of the reference signals are different. The distributed time domain densities of the reference signals may be, for example, distribution periods of the reference signals. For example, if the reference signal is the CSI-RS, and the period is 10 ms or 40 ms, the CSI-RS with the period of 10 ms is the first-type reference signal, and the CSI-RS with the period of 40 ms may be the second-type reference signal.

3. Reference signals are the same, but distributed frequency ranges of the reference signals are different. The distributed frequency ranges of the reference signals may include at least one of the following: a bandwidth of the frequency range corresponding to the reference signal, a distributed density of the reference signal in frequency domain, or the frequency range corresponding to the reference signal.

An example in which the reference signals are different is used for description. Beams of the CSI-RS and the SSB are usually different. For example, the CSI-RS may implement a finer deployment direction compared with the SSB. As a result, when the terminal device moves, a change of a measurement result based on the CSI-RS is greater than that of a measurement result based on the SSB. To ensure transmission performance, the RRM measurement based on the CSI-RS may be performed more frequently than the RRM measurement based on the SSB. In this case, by introducing different first information and second information, different measurement durations and different measurement periods may be adaptively used for different types of reference signals, to optimize a measurement process and ensure the RRM measurement result. In addition, if the RRM measurement is performed based on a measurement configuration corresponding to the CSI-RS, data transmission on an active BWP may be frequently interrupted. Measurement configurations corresponding to the CSI-RS and the SSB are implemented separately, so that impact of the SSB-based RRM measurement on data transmission interruption can be reduced.

In another implementation, in this embodiment of this application, a quantity of beams measured by the terminal device by using the first information is different from a quantity of beams measured by using the second information. For example, when the quantity of beams is greater than a preset threshold, the RRM measurement may be performed by using the second information, and when the quantity of beams is less than or equal to the preset threshold, the RRM measurement may be performed by using the first information. Different quantities of beams correspond to different measurement requirements. For example, when the terminal device is at an edge of a cell, more beams need to be detected, to discover a more suitable cell to camp on. In this case, the terminal device may perform the RRM measurement by using the second information. However, when the terminal device is located in a center of the cell, there is a low probability that a handover occurs due to mobility. Therefore, in this case, the terminal device needs to detect only a few beams. In this case, the terminal device may perform the RRM measurement by using the first information. In the foregoing implementation, the first information and the second information are separately used to meet the measurement requirements for measuring the different quantities of beams.

It should be noted that, in this embodiment of this application, the first measurement duration included in the first information includes RF retuning time. Optionally, the RF retuning time is 140 μs, 500 μs, or a duration of one OFDM symbol. The duration of the OFDM symbol varies according to different subcarrier spacings (subcarrier spacing, SCS).

RF retuning time included in the second measurement duration included in the second information may be the same as the RF retuning time included in the first measurement duration, or may be greater than the RF retuning time included in the first measurement duration.

Figure 8:
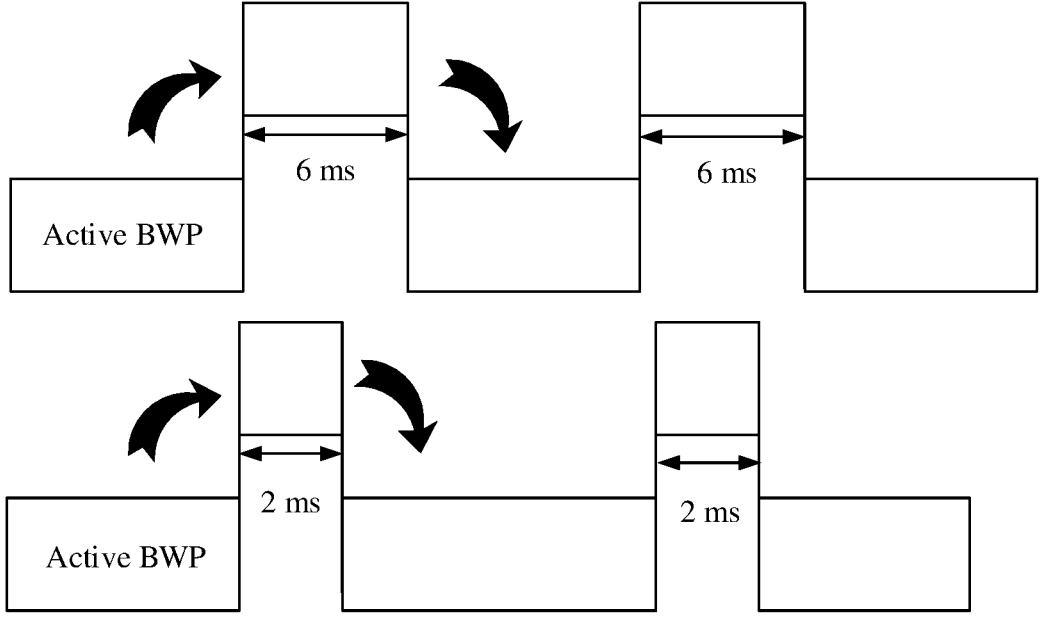
FIG. 8 is a schematic diagram of a measurement gap according to an embodiment of this application.

It should be noted that a plurality of measurement configurations are introduced in this embodiment of this application, so that different measurement configurations can be used for the different measurement requirements, thereby improving RRM measurement efficiency and reducing impact on service data. For example, as shown in FIG. 8, it is assumed that the first measurement duration included in the first information configured by the network device is 2 ms, and the second measurement duration included in the second information is 6 ms. In this embodiment of this application, because the terminal device performs the RRM measurement by using the first information, each interruption of the active BWP is at most 2 ms. Compared with an interruption duration of 6 ms caused by performing the RRM measurement by using the second information, a data transmission interruption duration can be significantly reduced, and data transmission efficiency is improved.

In the foregoing embodiments provided in this application, the methods provided in embodiments of this application are separately described from a perspective of interaction between devices. To implement functions in the methods provided in the foregoing embodiments of this application, the network device or the terminal device may include a hardware structure and/or a software module, and implement the foregoing functions in a form of the hardware structure, the software module, or a combination of the hardware structure and the software module. Whether a specific function in the foregoing functions is performed by the hardware structure, the software module, or the combination of the hardware structure and the software module depends on particular applications and design constraints of the technical solutions.

In embodiments of this application, division into the modules is an example, is merely logical function division, and may be other division in an actual implementation. In addition, functional modules in embodiments of this application may be integrated into one processor, may exist alone physically, or two or more modules may be integrated into one module. The integrated module may be implemented in a form of hardware, or may be implemented in a form of a software functional module.

Figure 9:
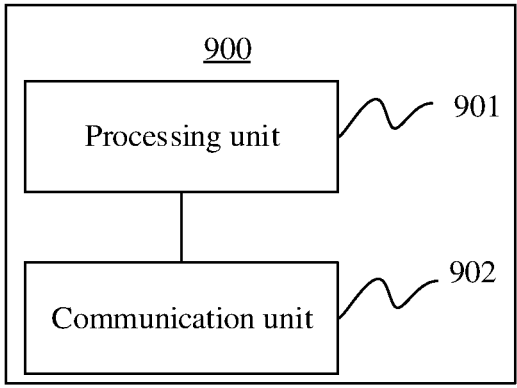
FIG. 9 is a schematic diagram of a structure of a communication apparatus according to an embodiment of this application.

Same as the foregoing concept, as shown in FIG. 9, an embodiment of this application further provides an apparatus 900, configured to implement the function of the network device or the terminal device in the foregoing method. For example, the apparatus may be a software module or a chip system. In this embodiment of this application, the chip system may include a chip, or may include a chip and another discrete component. The apparatus 900 may include a processing unit 901 and a communication unit 902.

In this embodiment of this application, the communication unit may also be referred to as a transceiver unit, and may include a sending unit and/or a receiving unit, which are respectively configured to perform sending and receiving steps of the network device or the terminal device in the foregoing method embodiments.

The communication apparatus provided in this embodiment of this application is described in detail with reference to FIG. 9 and FIG. 10. It should be understood that descriptions of apparatus embodiments correspond to the descriptions of the method embodiments. Therefore, for content that is not described in detail, refer to the foregoing method embodiments. For brevity, details are not described herein again.

The communication unit may also be referred to as a transceiver, a transceiver machine, a transceiver apparatus, or the like. The processing unit may also be referred to as a processor, a processing board, a processing module, a processing apparatus, or the like. Optionally, a component that is in the communication unit 902 and that is configured to implement a receiving function may be considered as a receiving unit, and a component that is in the communication unit 902 and that is configured to implement a sending function may be considered as a sending unit. That is, the communication unit 902 includes the receiving unit and the sending unit. The communication unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

When the communication apparatus 900 performs the function of the terminal device in the procedure shown in FIG. 4 in the foregoing embodiment, the processing unit is configured to determine first information and second information, where the first information includes a first measurement duration and a first measurement period, and the second information includes a second measurement duration and a second measurement period; and the communication unit is configured to: apply the first measurement period and/or the first measurement duration when radio resource management RRM measurement is performed on a first-type cell; and apply the second measurement period and the second measurement duration when the RRM measurement is performed on a second-type cell.

When the communication apparatus 900 performs the function of the network device in the procedure shown in FIG. 4 in the foregoing embodiment, the processing unit is configured to determine first information and second information, where the first information includes a first measurement duration and a first measurement period, the second information includes a second measurement duration and a second measurement period, the first measurement period and/or the first measurement duration are/is applied to performing radio resource management RRM measurement on a first-type cell, and the second measurement period and the second measurement duration are applied to performing the RRM measurement on a second-type cell; and the communication unit is configured to indicate the first information and the second information to a terminal device.

The foregoing is merely an example. The processing unit 901 and the communication unit 902 may further perform other functions. For more detailed descriptions, refer to the related descriptions in the method embodiment shown in FIG. 4. Details are not described herein again.

Figure 10:
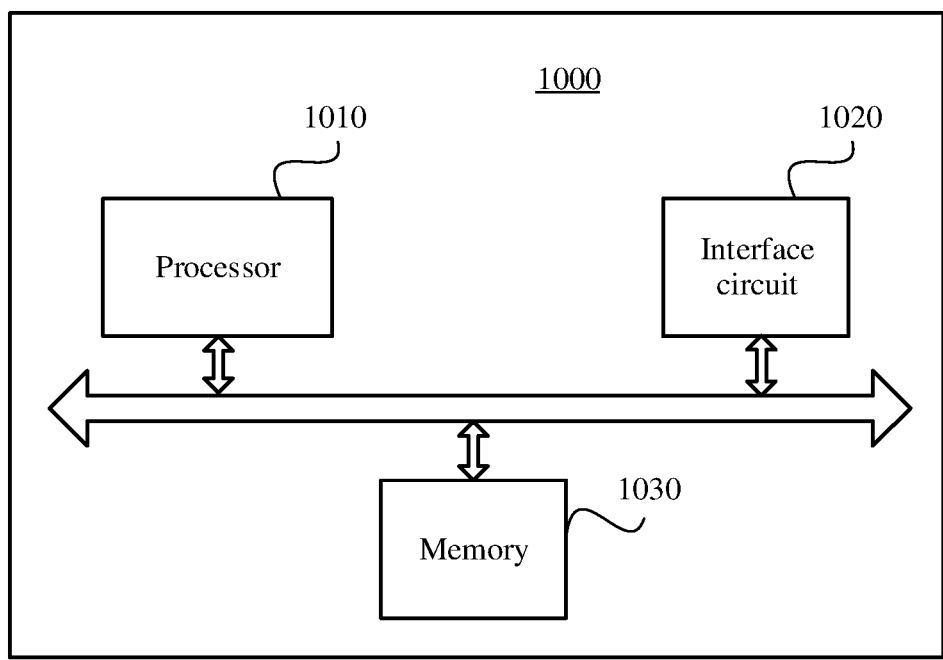
FIG. 10 is a schematic diagram of a structure of a communication apparatus according to an embodiment of this application.

FIG. 10 shows an apparatus 1000 according to an embodiment of this application. The apparatus shown in FIG. 10 may be an implementation of a hardware circuit of the apparatus shown in FIG. 9. The communication apparatus is applicable to the foregoing flowchart, and performs the function of the terminal device or the network device in the foregoing method embodiments. For ease of description, FIG. 10 shows only main components of the communication apparatus.

As shown in FIG. 10, the communication apparatus 1000 includes a processor 1010 and an interface circuit 1020. The processor 1010 and the interface circuit 1020 are coupled to each other. It may be understood that the interface circuit 1020 may be a transceiver or an input/output interface. Optionally, the communication apparatus 1000 may further include a memory 1030, configured to store instructions executed by the processor 1010, store input data required by the processor 1010 to run the instructions, or store data generated after the processor 1010 runs the instructions.

When the communication apparatus 1000 is configured to implement the method shown in FIG. 4, the processor 1010 is configured to implement the function of the processing unit 901, and the interface circuit 1020 is configured to implement the function of the communication unit 902.

When the communication apparatus is a chip applied to a terminal device, the chip in the terminal device implements the function of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip applied to a network device, the chip in the network device implements the function of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that the processor in embodiments of this application may be a central processing unit (Central Processing Unit, CPU), may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA), another programmable logic device, a transistor logic device, a hardware component, or any combination thereof. The general-purpose processor may be a microprocessor or any conventional processor.

In embodiments of this application, the processor may be a random access memory (Random Access Memory, RAM), a flash memory, a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in a network device or a terminal device. The processor and the storage medium may alternatively exist in the network device or the terminal device as discrete components.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

The computer program instructions may alternatively be stored in a computer-readable memory that can indicate a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method comprising:
   determining first information and second information, wherein the first information comprises a first measurement duration and a first measurement period, and the second information comprises a second measurement duration and a second measurement period, wherein the first measurement duration is less than the second measurement duration;
   applying the first measurement period and the first measurement duration to perform radio resource management (RRM) measurement on a first-type cell, wherein the first-type cell comprises a serving cell and a non-serving cell that has a fixed timing difference from timing information of the serving cell; and
   applying the second measurement period and the second measurement duration to perform the RRM measurement on a second-type cell, wherein the second-type cell comprises a non-serving cell that does not have the fixed timing difference from the timing information of the serving cell.

2. The method according to claim 1, wherein before performing the RRM measurement, the method further comprises:
   determining that an active BWP does not comprise an RRM measurement reference signal.

3. The method according to claim 1, wherein the first-type cell comprises a serving cell, and the second-type cell comprises a non-serving cell.

4. The method according to any one of claim 1, wherein before the performing the RRM measurement on a second-type cell, the method further comprises:
   determining that a measurement result of performing the RRM measurement on the first-type cell satisfies a preset condition.

5. The method according to claim 4, wherein the preset condition is:
   the measurement result obtained in at least one first measurement period within a preset time range is less than a preset threshold.

6. The method according to claim 1, wherein before the performing the RRM measurement on a second-type cell, the method further comprises:
   receiving third information, wherein the third information indicates to perform the RRM measurement on the second-type cell based on the second information.

7. The method according to claim 6, wherein the third information is carried in downlink control information (DCI) or a media access control (MAC) control element (CE).

8. The method according to claim 1, wherein the first measurement duration comprises one or more of a first duration, a second duration, or a third duration, wherein no physical uplink channel and physical uplink signal is sent to a network device within the first duration, the second duration, and the third duration, and no physical downlink channel and downlink signal is received from the network device, and wherein the first duration is a continuous transmission duration of an RRM measurement reference signal on which the RRM measurement is to be performed, the second duration is a preset duration before a start symbol of the RRM measurement reference signal, and the third duration is a preset duration after an end symbol of the RRM measurement reference signal.

9. The method according to claim 8, wherein the second duration is 140 microseconds or 500 microseconds, and wherein the third duration is 140 microseconds or 500 microseconds.

10. The method according to claim 1, wherein within the first measurement duration, no physical uplink channel and physical uplink signal is sent to a network device, and no physical downlink channel and downlink signal is received from the network device.

11. The method according to claim 1, wherein the first measurement duration is same as a measurement duration of a synchronization information block measurement timing configuration (SMTC) or a measurement period of the SMTC.

12. The method according to claim 1, wherein the first measurement duration is less than or equal to 1 millisecond, and the first measurement period is greater than or equal to 40 milliseconds.

13. The method according to claim 1, wherein the first measurement duration and the first measurement period satisfy one of the following:

the first measurement duration is equal to 1.5 milliseconds and the first measurement period is equal to 20 milliseconds;

the first measurement duration is equal to 1.5 milliseconds and the first measurement period is equal to 40 milliseconds;

the first measurement duration is equal to 1.5 milliseconds and the first measurement period is equal to 80 milliseconds; and the first measurement duration is equal to 1.5 milliseconds and the first measurement period is equal to 160 milliseconds.

14. The method according to claim 1, wherein a frequency range corresponding to the first information is same as a frequency range corresponding to the second information.

15. A communication apparatus, comprising:

at least one processor; and one or more memories coupled to the at least one processor and storing programming instructions for execution by the at least one processor to perform operations comprising:

determining first information and second information, wherein the first information comprises a first measurement duration and a first measurement period, and the second information comprises a second measurement duration and a second measurement period, wherein the first measurement duration is less than the second measurement duration;

applying the first measurement period and the first measurement duration to perform radio resource management (RRM) measurement on a first-type cell, wherein the first-type cell comprises a serving cell and a non-serving cell that has a fixed timing difference from timing information of the serving cell; and applying the second measurement period and the second measurement duration to perform the RRM measurement on a second-type cell, wherein the second-type cell comprises a non-serving cell that does not have the fixed timing difference from the timing information of the serving cell.

16. The apparatus according to claim 15, wherein the operations further comprising:

before the RRM measurement is performed, determining that an active BWP does not comprise an RRM measurement reference signal.

17. A non-transitory computer-readable storage medium storing instructions for execution by at least one processor to perform operations comprising:

determining first information and second information, wherein the first information comprises a first measurement duration and a first measurement period, and the second information comprises a second measurement duration and a second measurement period, wherein the first measurement duration is less than the second measurement duration;

applying the first measurement period and the first measurement duration to perform radio resource management (RRM) measurement on a first-type cell, wherein the first-type cell comprises a serving cell and a non-serving cell that has a fixed timing difference from timing information of the serving cell; and applying the second measurement period and the second measurement duration to perform the RRM measurement on a second-type cell, wherein the second-type cell comprises a non-serving cell that does not have the fixed timing difference from the timing information of the serving cell.

18. The non-transitory computer-readable storage medium according to claim 17, wherein the operations further comprising:

before the RRM measurement is performed, determining that an active BWP does not comprise an RRM measurement reference signal.

* * * * *